(12) United States Patent
Earhart

(10) Patent No.: US 7,604,561 B2
(45) Date of Patent: Oct. 20, 2009

(54) MULTI-SPEED COUNTERSHAFT TRANSMISSION WITH A PLANETARY GEAR SET AND METHOD

(75) Inventor: David Earl Earhart, Brownsburg, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 311 days.

(21) Appl. No.: 11/626,872

(22) Filed: Jan. 25, 2007

(65) Prior Publication Data

US 2008/0182700 A1 Jul. 31, 2008

(51) Int. Cl.
  *F16H 37/02* (2006.01)
(52) U.S. Cl. .......................................... 475/218; 74/331
(58) Field of Classification Search ................. 475/207, 475/218; 74/329, 330, 331, 335, 340
  See application file for complete search history.

(56) References Cited

U.S. PATENT DOCUMENTS

| 5,112,283 | A | * | 5/1992 | Miyata et al. | ............... 475/211 |
|---|---|---|---|---|---|
| 5,390,560 | A | * | 2/1995 | Ordo | ........................... 74/329 |
| 5,571,058 | A | * | 11/1996 | Schmidt | .......................... 475/5 |
| 6,387,006 | B1 | | 5/2002 | Jung | |
| 6,869,379 | B2 | | 3/2005 | Voss et al. | |
| 7,070,534 | B2 | * | 7/2006 | Pelouch | ....................... 475/214 |
| 7,166,049 | B2 | * | 1/2007 | Saller | ............................ 475/5 |
| 7,470,206 | B2 | * | 12/2008 | Rodgers, II | ................. 475/218 |
| 2002/0148310 | A1 | * | 10/2002 | Uchino | ......................... 74/335 |

* cited by examiner

*Primary Examiner*—Charles A Marmor
*Assistant Examiner*—Justin Holmes

(57) ABSTRACT

A transmission is provided that combines first and second shaft members in a countershaft configuration with a planetary gear set and first and second head gear sets to provide ratios. Each of the shaft members includes gears in no more than four co-planar, intermeshing gear sets (and in some embodiments no more than three co-planar, intermeshing gear sets) and two sets of radially nested clutches, thus minimizing the overall length of the shaft members. At least one gear concentric with each shaft member is supported by a bearing on the adjacent gear rather than on the shaft member, thereby minimizing the weight of each shaft member. The transmission provides at least seven forward speed ratios and a reverse speed ratio and utilizes at most eight torque-transmitting mechanisms. A method of reducing the length and weight of a transmission package is also provided.

22 Claims, 6 Drawing Sheets

| SPEED RATIO | TORQUE RATIO | RATIO STEP | C1 | C2 | C3 | C4 | C5 | C6 | C7 | DF | DR |
|---|---|---|---|---|---|---|---|---|---|---|---|
| Rev 2 | -2.53 | | | | X | | | | X | | X |
| Rev 1 | -8.68 | | | | X | | | X | | | X |
| 1 | 7.40 | | X | | | | | X | | O | O |
| 2 | 5.71 | 1.30 | | X | | | | X | | X | |
| 3 | 4.41 | 1.29 | | | X | | | X | | X | |
| 4 | 3.43 | 1.29 | | | | X | | X | | X | |
| 5 | 2.67 | 1.28 | | | | | X | | | X | |
| 6 | 2.16 | 1.24 | X | | | | | | X | X | |
| 7 | 1.67 | 1.30 | | X | | | | | X | X | |
| 8 | 1.29 | 1.29 | | | X | | | | X | X | |
| 9 | 1.00 | 1.29 | | | | X | | | X | X | |
| 10 | 0.78 | 1.28 | | | | | X | | X | X | |
| TRC | 9.51 | | | | | | | | | | |

X=Engaged; O=SHIFTED EITHER DIRECTION

FIG. 1B

| SPEED RATIO | TORQUE RATIO | RATIO STEP |
|---|---|---|
| Rev 2 | -2.3242 | 3.4286 |
| Rev 1 | -7.9688 | |
| F1 | 7.1073 | |
| F2 | 5.3330 | 1.3327 |
| F3 | 3.9648 | 1.3451 |
| F4 | 2.8894 | 1.3722 |
| F5 | 2.0703 | 1.3956 |
| F6 | 1.5555 | 1.3310 |
| F7 | 1.1564 | 1.3451 |
| F8 | 1.0000 | 1.1564 |
| F9 | 0.8457 | 1.1825 |

FIG. 2B

| SPEED RATIO | TORQUE RATIO | RATIO STEP | C1 | C2 | C3 | C4 | C5 | C6 | C7 |
|---|---|---|---|---|---|---|---|---|---|
| Rev 2 | -2.14 | | | | X | | | | X |
| Rev 1 | -7.33 | | X | | X | | | | |
| 1 | 6.35 | | X | | | | | | |
| 2 | 4.65 | 1.37 | | X | | | | X | |
| 3 | 3.43 | 1.35 | | | | X | | X | |
| 4 | 2.53 | 1.36 | | | | | | X | |
| 5 | 1.85 | 1.36 | | | | | X | X | |
| 6 | 1.36 | 1.37 | X | X | | | | | X |
| 7 | 1.00 | 1.35 | | | | | X | | X |
| 8 | 0.74 | 1.36 | | | | | | | X |
| TRC | 8.62 | | | | | | | | |

X=Engaged

FIG. 3B

| SPEED RATIO | TORQUE RATIO | RATIO STEP | C1 | C2 | C3 | C4 | C5 | C6 | C7 |
|---|---|---|---|---|---|---|---|---|---|
| Rev 2 | -2.00 | | | | X | | | | X |
| Rev 1 | -6.88 | | X | | X | | | | |
| 1 | 5.99 | | X | | | | | | |
| 2 | 4.26 | 1.41 | | X | | | | X | |
| 3 | 2.73 | 1.56 | | | | | | X | |
| 4 | 1.75 | 1.56 | | | | X | | X | |
| 5 | 1.24 | 1.41 | X | X | | | | | X |
| 6 | 1.00 | 1.24 | | | | | | | X |
| 7 | 0.80 | 1.26 | | | | | X | | X |
| TRC | 7.54 | | | | | | | | |

X=Engaged

FIG. 3C

MULTI-SPEED COUNTERSHAFT TRANSMISSION WITH A PLANETARY GEAR SET AND METHOD

TECHNICAL FIELD

The invention relates to a multi-speed transmission having a planetary gear set and first and second shaft members in a countershaft configuration.

BACKGROUND OF THE INVENTION

Automotive vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. Increasing the number of speed ratios in an automatic transmission reduces the step size between each ratio, improving the shift quality of the transmission by making the ratio interchanges substantially imperceptible to the operator under normal vehicle acceleration.

A variety of different types of transmissions are used to deliver multiple speed ratios including manual, automated manual, dual clutch and planetary transmissions. For example, a typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. This concept typically uses countershaft gears with a different, dedicated gear pair to achieve each forward speed ratio (with the exception of being able to achieve a direct drive ratio in a rear wheel drive application). The transmission utilized for a specific application may depend on many factors, such as a minimization of required components, packaging limitations, ratio coverage and torque requirements for launch.

SUMMARY OF THE INVENTION

A multi-speed transmission is provided that combines first and second shaft members in a countershaft configuration with a planetary gear set to achieve at least seven forward speed ratios and at least one reverse speed ratio. The transmission includes a main shaft operatively connected to a transmission input member as well as the planetary gear set operatively connected to a transmission output member.

The transmission also includes a plurality of gears forming different co-planar, intermeshing gear sets, each of the gears being concentric about the main shaft, the first shaft member, or the second shaft member. Preferably, the transmission includes not more than five total co-planar, intermeshing gear sets. The gears that are concentric about the first shaft member are aligned in not more than four co-planar, intermeshing gear sets; the gears that are concentric about the second shaft member are preferably aligned in not more than three co-planar, intermeshing gear sets. The transmission employs at least seven, but not more than eight torque-transmitting mechanisms to achieve the forward and reverse speed ratios.

In one aspect of the present invention, the range gears mounted concentrically about the first shaft member each intermesh with a gear on the main shaft that does not intermesh with a range gear concentrically mounted about the second shaft member. Likewise, the range gears mounted concentrically about the second shaft member each intermesh with a gear on the main shaft that does not intermesh with a range gear concentrically mounted about the first shaft member. In other words, the present invention provides a "unique" gear on the main shaft for each range gear that is not engageable by another range gear. This arrangement allows for increased flexibility in the selection of the transmission gear ratios.

Only two rotating clutches are needed on each of the first and second shaft members in order to establish the forward speed ratios. Preferably, the two rotating clutches are nested or radially stacked one inside the other and mounted concentrically about each shaft member. This alternate arrangement allows for minimization of the overall length requirement of each shaft member.

It is also preferred that at least one gear concentric about each shaft member be rotatably supported by a bearing on the adjacent gear rather than on the shaft member. This novel arrangement allows for each gear to be attached directly to a clutch by a shaft that is required to carry only the torsional load (the supporting gear transferring all axial loads to ground.) As such, the traditional heavy countershaft is replaced by the shaft members of the present invention, thereby reducing the overall weight of the transmission.

In another aspect of the present invention, the transmission is characterized by an absence of dual input or dual output torque-transmitting mechanisms, instead utilizing first and second head gear sets that provide a ratio to transfer torque to the first and second shaft members, respectively. The first and second head gear sets at least partially form a first co-planar, intermeshing gear set. As used herein, a "head gear set" is a set of intermeshing gears that transfers torque from the input member to a shaft member in the transmission. By utilizing the first and second head gear sets as well as the planetary gear set to provide ratios, the number of gears required on the shaft members is decreased, thus further minimizing the overall length of the shaft members.

The reverse speed ratio may be provided in a number of ways. For example, one of the torque-transmitting mechanisms may be a reverse torque-transmitting mechanism that is a two-way dog clutch concentric with and supported by the first shaft member. The two-way dog clutch is shiftable in one direction to establish the reverse speed ratios, and shiftable in an opposite direction to establish the forward speed ratios. Preferably, the two-way dog clutch is packaged at the output end of the transmission, generally aligned with the fourth or fifth co-planar, intermeshing gear set. Alternatively, a "wet" multi-disk rotating clutch may be employed to provide the reverse gearing instead of the two-way dog clutch.

In yet another aspect of the present invention, one of the torque-transmitting mechanisms is a direct drive torque-transmitting mechanism that is selectively engageable to transfer torque directly from the input member to the planetary gear set, thereby bypassing the shaft members.

In yet another aspect of the invention, one of the torque-transmitting mechanisms is a lock-up clutch selectively engageable to connect any two members of the planetary gear set for common rotation, thereby causing the entire planetary gear set to rotate at the same speed (i.e., locking-up the planetary gear set).

In yet another aspect of the present invention, one of the torque-transmitting mechanisms is a brake selectively engagable to ground a ring gear member of the planetary gear set to the stationary member such as the transmission housing. The brake may also be referred to as a grounded clutch or stationary clutch.

In addition to its compact design, the transmission has many additional benefits. The transmission has adequate ratio coverage to meet both takeoff and low engine speed highway cruising requirements of a linehaul vehicle, although its use is not limited to linehaul vehicles. Furthermore, the highest three gear ratios are very close, allowing for more precise modulation of engine speed at higher vehicle speeds when fuel economy is most critical. The combination of a planetary gear set and a countershaft configuration allows for increased fuel efficiency over a traditional planetary transmission. The wide ratio coverage and relatively small ratio steps will enable lock-up of an associated torque converter in first gear as well as shifting during torque-converter lock-up. The ability to operate with the torque converter locked significantly reduces transmission cooling demands.

A method of reducing the length and weight of a transmission package is also provided. The transmission package includes a main shaft member and a pair of secondary shaft members arranged in a substantially parallel, triangular formation with the main shaft member. The transmission package also includes a plurality of gears that are selectively interconnectable with respective clutches to obtain a plurality of selectable gear ratios. The method includes the steps of: nesting (or radially stacking) at least some of the clutches sufficiently to at least partially reduce the length of the package; supporting at least one of the gears on a bearing disposed on an adjacent gear or synchronizer rather than on one of the secondary shaft members, allowing for that secondary shaft member to be sufficiently shorter and lighter to fit within and further reduce the length of the package; and providing that each forward range gear concentric with one of the secondary shaft members directly meshes with a gear on the main shaft member that does not directly mesh with another forward range gear concentric with the other secondary shaft member thereby permitting improved flexibility in the selection of the ratios.

The above features and advantages, and other features and advantages of the present invention, will be readily apparent from the following detailed description of the preferred embodiments and best modes for carrying out the invention when taken in connection with the accompanying drawings.

BRIEF DESCRIPTION OF THE DRAWINGS

FIG. 1B is a truth table listing the engaged torque-transmitting mechanisms and torque ratios for each of the speed ratios of the transmission of FIG. 1A, and also listing the ratio steps between the forward torque ratios;

FIG. 2B is a truth table listing the torque ratios and step ratios for each of the speed ratios of the transmission of FIG. 2A;

FIG. 3B is a truth table listing the engaged torque-transmitting mechanisms and torque ratios for each of the speed ratios of the transmission of FIG. 3A having eight forward speed ratios; and FIG. 3C is a truth table listing the engaged torque-transmitting mechanisms and torque ratios for each of the speed ratios of the transmission of FIG. 3A having only seven forward speed ratios.

DESCRIPTION OF THE PREFERRED EMBODIMENTS

Figure 1A:
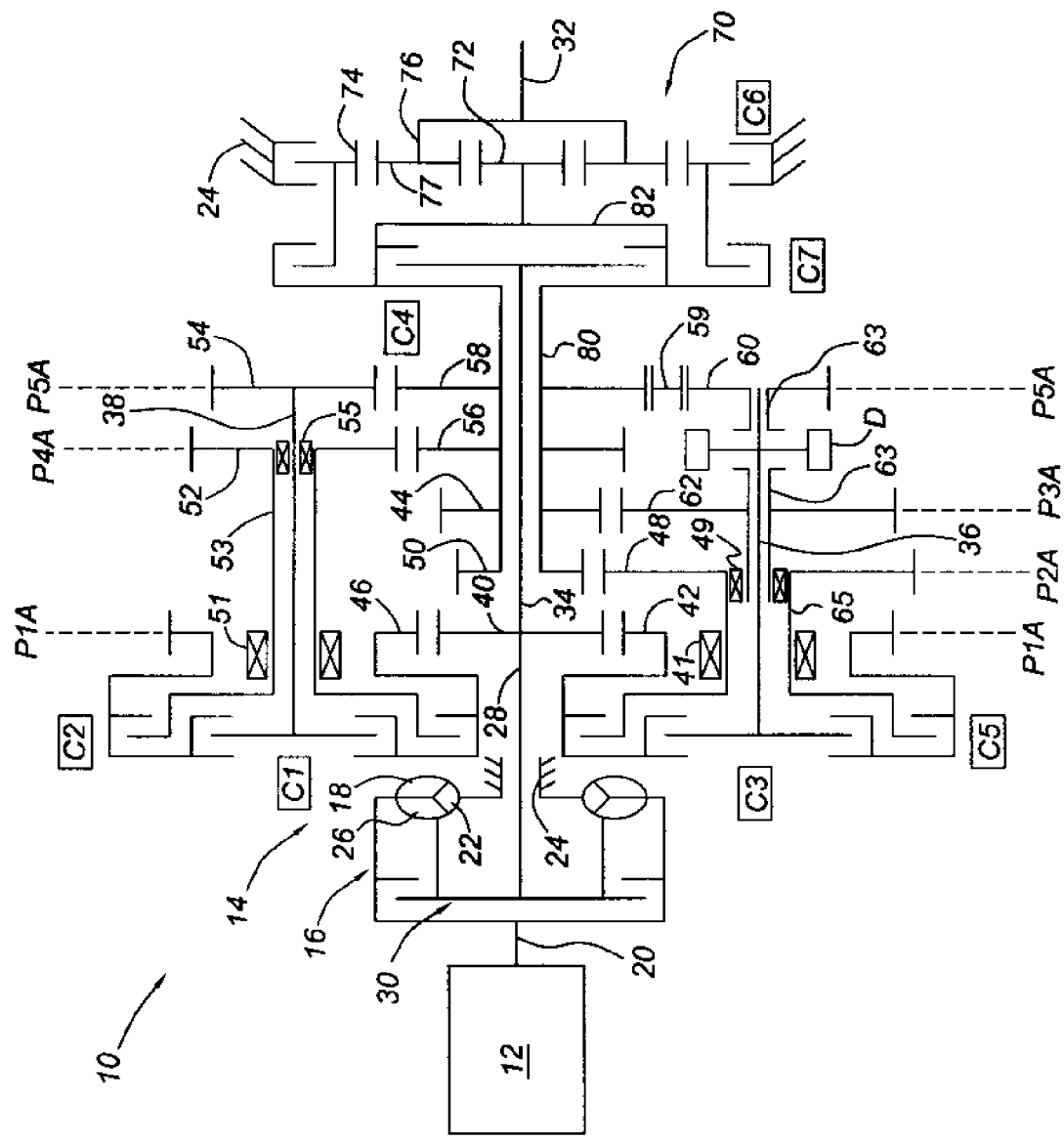
FIG. 1A is a schematic representation of a first embodiment of a transmission in accordance with the present invention.

Referring to the drawings, wherein like reference numbers refer to like components throughout the several views, FIG. 1A illustrates a powertrain, shown generally as 10, that includes an engine 12 operatively connected to a transmission 14 through a torque converter 16. FIG. 1A is a "stick-diagram" or schematic representation of transmission 14, in accordance with the present invention.

The torque converter 16 includes a pump portion 18 connected for rotation with an engine shaft 20, a stator portion 22 grounded to a stationary member such as the transmission housing or casing 24, and a turbine portion 26. As is understood by those skilled in the art, the torque converter 16 is a fluid coupling providing torque multiplication between the pump portion 18 and the turbine portion 26. The turbine portion 26 is connected for rotation with an input member 28 of the transmission 14. The torque converter 16 includes a lock-up clutch, shown generally as 30. When the lock-up clutch 30 is engaged, power flow from the engine shaft 20 is directly connected with the input member 28, bypassing the fluid coupling and torque multiplication of the pump portion 18 and turbine portion 26.

The transmission 14, as illustrated in FIG. 1A, is operable to provide ten forward speed ratios and at least one reverse speed ratio between the input member 28 and an output member 32. Each speed ratio corresponds with a respective speed or "Speed Ratio", as set forth in the first column of FIG. 1B and a corresponding torque ratio shown in the second column of FIG. 1B, as is understood by those skilled in the art.

The transmission 14 includes a main shaft 34, a first shaft member 36, and a second shaft member 38. The input member 28 is connected for common rotation with the main shaft 34. The first and second shaft members 36, 38 are arranged generally parallel with and in different planes than the main shaft 34 (i.e., having axes in a substantially triangular formation), synonymous with that of a countershaft transmission.

The transmission 14 includes a plurality of intermeshing gears as will be described herein. The main shaft 34 has a gear 40 connected for common rotation therewith. Gear 40 continuously intermeshes with gear 42, gear 42 being selectively engageable for common rotation with the first shaft member 36, via clutch C3, or gear 48, via clutch C5. Gears 40 and 42 are also referred to as a first head gear set. Gear 40 also continuously intermeshes with gear 46, gear 46 being selectively engageable for common rotation with gear 54, via clutch C1, or gear 52, via clutch C2. Gears 40 and 46 are also referred to as a second head gear set. The first and second head gear sets, namely gears 40, 42, and 46, form a first, co-planar, intermeshing gear set, the co-planar nature of which is indicated by plane P1A. By arranging the first and second head gear sets, defined by gears 40, 42, and 46, in a single plane, the compactness of the transmission 14 is maximized. Preferably, the co-planar, intermeshing gear sets described herein include at least one gear concentric with the main shaft 34 and a gear concentric with one of the shaft members 36, 38.

Gear 48, also referred to herein as a "range gear", is mounted concentric with and rotatable about the first shaft member 36. Gear 48 is driven by sleeve shaft 65 via direct connection to clutch C5. Gear 48 continuously intermeshes with gear 50, which is supported on and rotatable with sleeve shaft 80 and mounted concentric with the main shaft 34. Gears 48 and 50 form a second co-planar, intermeshing gear set, the co-planar nature of which is indicated by plane P2A.

Gear 62, also referred to herein as a "range gear", is mounted concentric with and rotatable about the first shaft member 36 and is supported by a synchronizer 63. Gear 62 intermeshes with gear 44, which is supported on and rotatable with sleeve shaft 80 and mounted concentric with the main shaft 34. Gears 62 and 44 form a third co-planar intermeshing gear set, the co-planar nature of which is indicated by plane P3A.

Referring still to FIG. 1A, additional components of the transmission 14 include gears 52 and 54, also referred to herein as "range gears". Gears 52 and 54 are mounted concentric with and rotatable about the second shaft member 38. Gear 52 is driven by the sleeve shaft 53 via a direct connection to clutch C2. Gear 52 intermeshes with gear 56, which is supported on and rotatable with sleeve shaft 80 and mounted concentric with the main shaft 34. Gears 52 and 56 form a fourth co-planar, intermeshing gear set, the co-planar nature of which is indicated by plane P4A.

The second shaft member 38 has the gear 54 connected for common rotation therewith. Gear 54 intermeshes with gear 58, which is supported on and rotatable with sleeve shaft 80 and mounted concentric with the main shaft 34. Gear 58, via idler gear 59, also intermeshes with gear 60, gear 60 being mounted coaxially with the first shaft member 36 and supported by the synchronizer 63. Gears 54, 58, 59 and 60 form a fifth co-planar, intermeshing gear set, the co-planar nature of which is indicated by plane P5A.

Figure 2A:
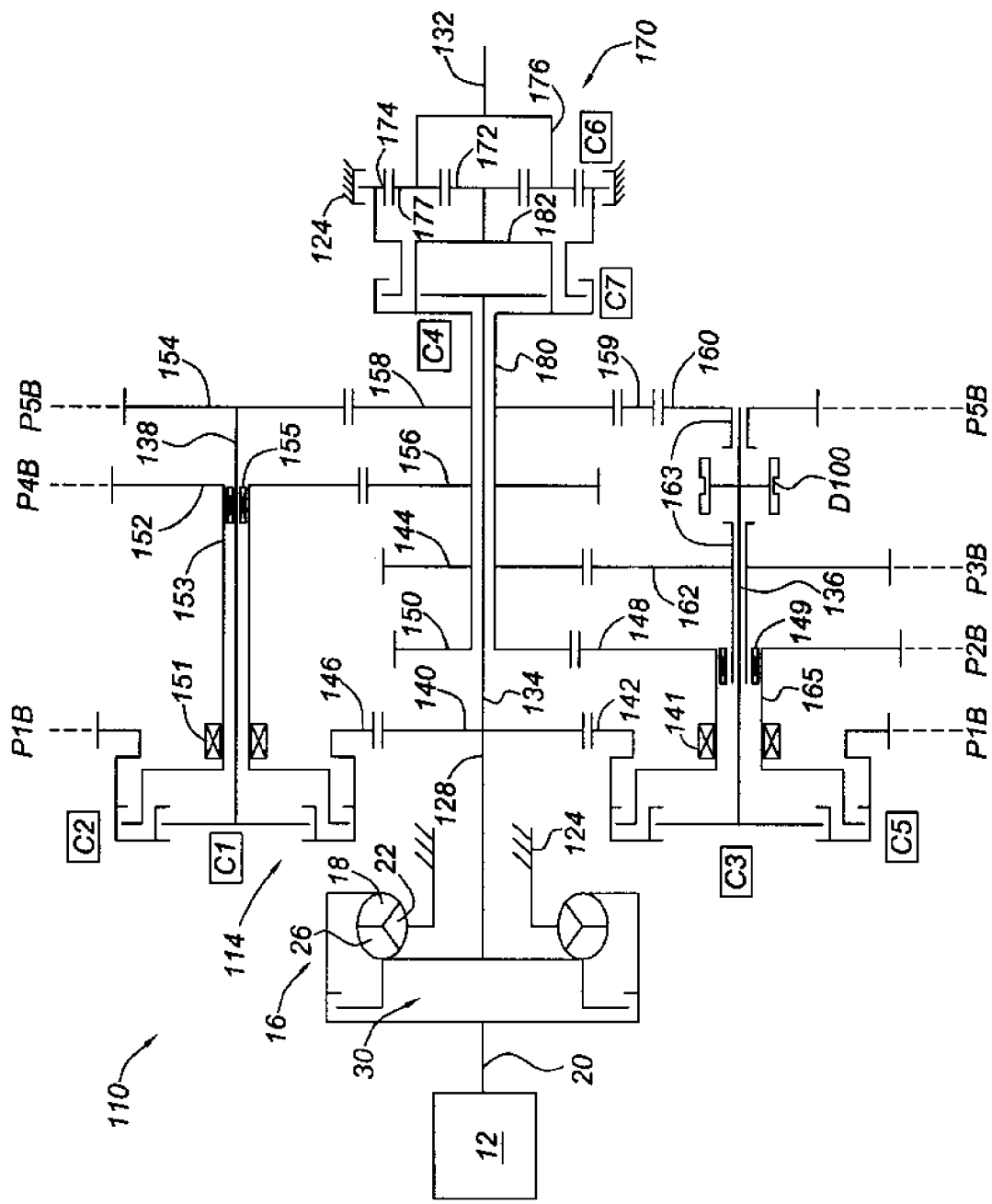
FIG. 2A is a schematic representation of a second embodiment of a transmission in accordance with the present invention, which operates according to the engagement schedule of FIG. 1B, but with only nine forward speed ratios and with the torque ratios and ratio steps indicated in FIG. 2B.
Figure 3A:
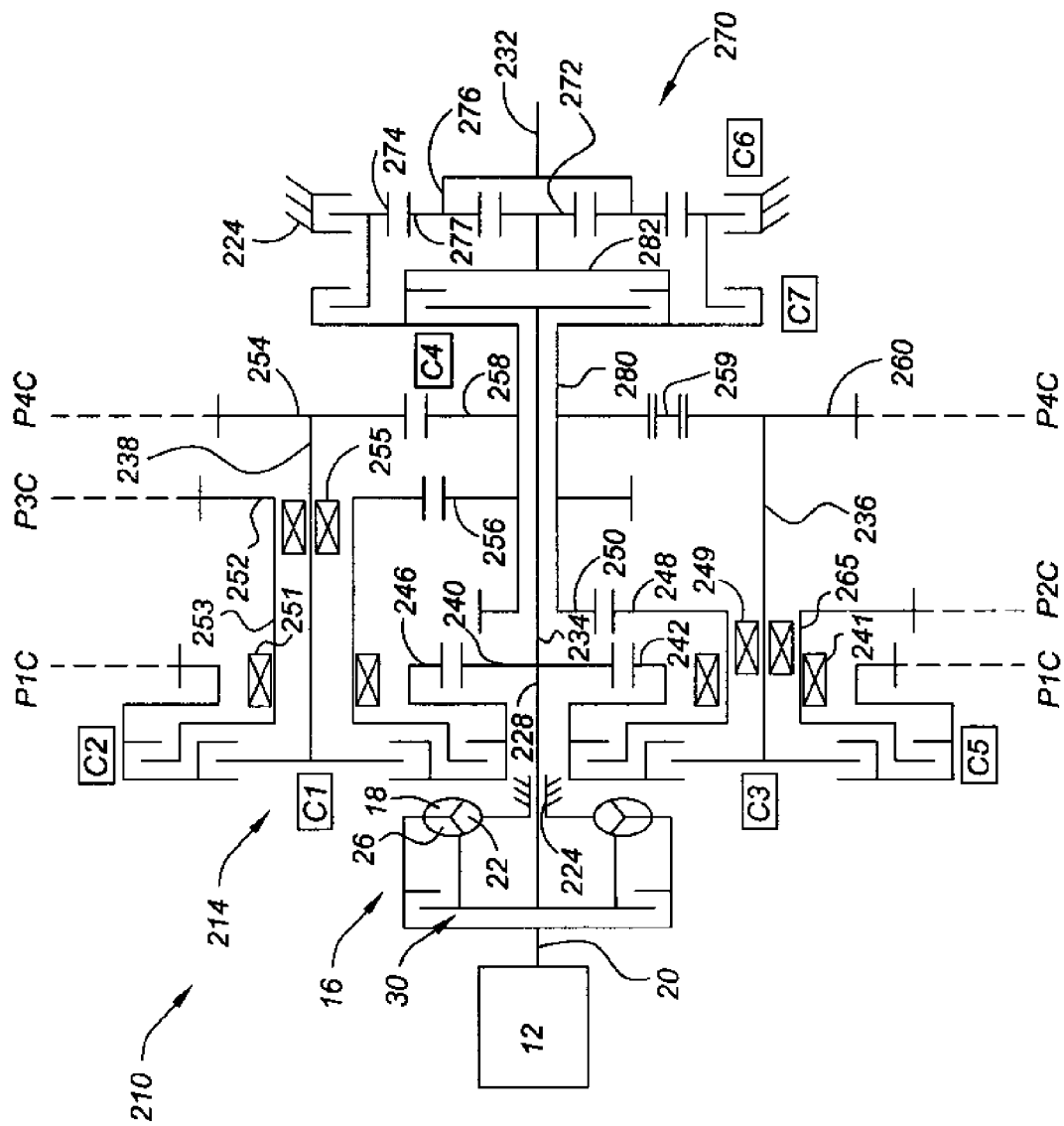
FIG. 3A is a schematic representation of a third embodiment of a transmission in accordance with the present invention.

As depicted in FIG. 1A, it is preferred that the range gears 48, 62 concentric with the first shaft member 36 intermesh with a gear (50, 44, respectively) rotatable about and concentric with the main shaft member 34 and not intermeshing with a range gear 52, 54 concentric with the second shaft member 38 (similarly illustrated in FIGS. 2A and 3A.) In other words, the gears 50 and 44 are "unique" to the range gears 48 and 62, respectively. Correspondingly, it is preferred that the range gears 52, 54 concentric with the second shaft member 38 intermesh with a gear (56, 58, respectively) rotatable about and concentric with the main shaft member 34 and not intermeshing with a range gear 48, 62 concentric with the first shaft member 36 (also similarly illustrated in FIGS. 2A and 3A.) In other words, gears 56 and 58 are "unique" to range gears 52 and 54, respectively. This provides for more flexibility in gear selection for transmission 14.

Unlike traditional countershaft transmissions, the embodiment of the present invention illustrated in FIG. 1A provides for the elimination of the conventional countershaft, upon which all gears have been traditionally supported. The transmission 14 includes the gears 42, 46, 48, and 52 as being supported by bearings 41, 51, 49, and 55, respectively. Namely, gear 42 is supported by bearing 41, which is disposed radially inside gear 42 and mounted on the flange portion of the adjacent gear 48, both gear 42 and bearing 41 being mounted concentrically with the first shaft member 36. Similarly, gear 48 is supported by bearing 49, which is disposed radially inside gear 48 and mounted on the synchronizer 63, both gear 48 and bearing 49 being mounted concentrically with the first shaft member 36. Furthermore, gear 46 is supported by bearing 51, which is disposed radially inside gear 46 and mounted on the flange portion of the adjacent gear 52, both gear 46 and bearing 51 being mounted concentrically with the second shaft member 38. Likewise, gear 52 is supported by the bearing 55, which is disposed radially inside gear 52 and mounted on the flange portion of the adjacent gear 54, both gear 52 and bearing 55 being mounted concentrically with the second shaft member 36. In this instance, the gears 48, 52, and 54 and synchronizer 63 take the place of the conventional loaded countershaft in that they support the adjacent gears 42, 46, 52 and 48, respectively, and in turn transfer the resultant radial and axial loads to ground. Consequently, the first shaft member 36 is only required to carry the torsional load of gears 42, 46 and 62, and can thereby be a lighter weight than the conventional heavier countershaft. Synonymously, the second shaft member 38 is only required to carry the torsional load of gears 46, 52, and 54, and can therefore be a lighter weight than the conventional heavier countershaft. By replacing the conventional heavier countershafts with the first and second shaft members 36, 38, the gross weight of the transmission 14 is reduced. The bearings 41, 49, 51 and 55 are preferably taper bearings.

Referring still to FIG. 1A, a two-way dog clutch D is supported by the synchronizer 63 and mounted concentrically with and shiftable in two directions along the first shaft member 36. The dog clutch D is shiftable to the left to connect gear 62 for common rotation with the first shaft member 36. The dog clutch D is also shiftable to the right to connect gear 60 for common rotation with the first shaft member 36. When the dog clutch D is shifted to the left, it partially establishes a forward speed ratio, as indicated in the column labeled "DF" in FIG. 1B. When the dog clutch D is shifted to the right. it partially establishes a reverse speed ratio as indicated in the column labeled "DR" in FIG. 1B. In a first forward speed ratio (as indicated in the first column of FIG. 1B), the dog clutch D may be shifted either to the left (DF) or to the right (DR). When the dog clutch D is shifted to the left, torque can be transferred from the first shaft member 36 through gears 62 and 44 to the sleeve shaft 80. Alternatively, when the dog clutch D is shifted to the right, torque can be transferred from the first shaft member 36 through gears 60 and 58, via idler gear 59, to the sleeve shaft 80.

The dog clutch D is preferably a manual-style clutch actuated by an independent actuator (not shown), such as in a hydraulic control system, to move the two-way dog clutch D from a neutral position to either the right or the left, as discussed above. The dog clutch D must be in the reverse position DR at any time the transmission 10 is to go in reverse; however, the dog D must be engaged in the forward position DF only when required to transmit torque (otherwise it can remain in neutral to reduce transmission losses.) The two-way dog clutch D is not actuated through the first shaft member 36, i.e., is not moved by moving the first shaft member 36. It is also contemplated within the scope and spirit of the present invention to employ other clutches (i.e., a wet multi-disk rotating clutch) to provide reverse gearing.

Transmission 14 further includes a planetary gear set, shown generally as 70 in FIG. 1A. The planetary gear set 70 includes a sun gear member 72, a ring gear member 74 and a carrier member 76 that rotatably supports a plurality of pinion gears 77. The sun gear member 72 is continuously connected for common rotation with the gears 44, 50, 56 and 58 via sleeve shaft 80 and hub member 82. The carrier member 76 is continuously connected for common rotation with the output member 32.

Referring still to FIG. 1A, the transmission 14 includes eight torque-transmitting mechanisms. The two-way dog clutch D is one of these eight torque-transmitting mechanisms. The other seven torque-transmitting mechanisms are referred to herein as C1, C2, C3, C4, C5, C6 and C7.

C1 is a rotating clutch supported on the second shaft member 38 and is selectively engagable to transmit torque from the main shaft 34 along the second head gear set, gears 40 and 46 in P1A, and second shaft member 38 to gear 54. C2 is a rotating clutch mounted concentric with the second shaft member 38 and is selectively engageable to transmit torque from the main shaft 34 along the second head gear set, gears 40 and 46 in P1A, and the sleeve shaft 53 to gear 54. As opposed to the traditional "side-by-side" or axial arrangement of clutches in traditional countershaft transmissions, C1 is said to be "nested" or radially "stacked" inside C2, as depicted by FIG. 1A. By nesting C1 inside C2 at the input end of the transmission 14, the second shaft member 38 and, consequently, the transmission housing 24, is of a reduced overall length and weight when compared to conventional countershafts and countershaft transmissions.

C3 is a rotating clutch supported on the first shaft member 36 and is selectively engagable to transmit torque from the main shaft 34 along the first head gear set, gears 40 and 42 in P1A, to the first shaft member 36. C5 is a rotating clutch supported on the first shaft member 36 and is selectively engagable to transmit torque from the main shaft 34 along the first head gear set, gears 40 and 42 in P1A, to sleeve shaft 65. Similar to the arrangement of C1 and C2, C3 is preferably stacked radially inside (or nested in) C5 at the input end of the transmission 14, as illustrated in FIG. 1A. By nesting C3 inside C5, the first shaft member 36 is of a reduced overall length and weight when compared to conventional countershafts.

C4 is referred to herein as a bypass torque-transmitting mechanism or clutch that is selectively engagable to connect the main shaft 34 directly with the sun gear member 72, bypassing the first and second shaft members 36, 38. C6 is a brake that is selectively engagable to connect the ring gear member 74 with the transmission housing 24. C7 is referred to herein as a lock-up torque-transmitting mechanism or a rotating clutch that is selectively engageable to lock-up the planetary gear set 70 thereby connecting gears 44, 50, 56 and 58 for common rotation with both sun gear 72 and ring gear 74 via sleeve shaft 80 and hub member 82; hence, the entire planetary gear set 70 rotates at the same speed as gears 44, 50, 56 and 58. As those skilled in the art will understand, when any two members of a planetary gear set are connected for common rotation, the entire planetary gear set rotates at the same speed.

Referring to FIG. 1B, the engagement schedule of the torque-transmitting mechanisms C1-C7 and D is indicated to achieve two reverse speed ratios and ten forward speed ratios. C6 is applied during speed ratios 1 through 5 (i.e., to provide the first five speed ratios) wherein the clutches C1, C2, C3, C4 and C5 may be selectively engaged in order. C7 is applied during speed ratios 6 through 10 to lock-up the planetary gear set 70 by connecting the gears 44, 50, 56 and 58 via sleeve shaft 80 and hub member 82 directly to both the ring gear member 74 and the sun gear member 72. When C7 is applied to lock up the planetary gear set 70, the clutches C1, C2, C3, C4 and C5 may be selectively engaged in order, providing an additional five speed ratios, indicated as ratios 6 though 10 in FIG. 1B. Each of the clutches C1-C5 are "reused" in achieving the ten forward speed ratios. This enables the shaft members 36 and 38 to be shorter in overall length.

The two-way dog clutch D is packaged in what would otherwise likely be an unused space between the third and fifth planes P3A and P5A, respectively, thus not extending the required length of the first shaft member 36. The ratio change provided by the first and second headsets, gears 40, 42, and 46, and that available through the planetary gear set 70 enable ten forward speed ratios to be achieved using only two clutches on each of the shaft members 36,38. A nine speed version of this same schematic (illustrated in FIG. 2A) can be established by skipping one of the 5 clutches C1-C5 when operating in ratios 1-4; when the planetary gear set 70 is locked for ratios 5-8, the excluded clutch can be applied to split any of the ratios from 5-8, thus after locking the planetary gear set 70 there will be ranges 5-9. For fuel economy reasons, this schematic works best when splitting ranges 7-8, providing a smaller step between ratios 7 to 8 and ratios 8 to 9.

As is apparent in FIG. 1A, the first shaft member 36 has gears in only four of the co-planar, intermeshing gear sets (as indicated by planes P1A, P2A, P3A and P5A.) The second shaft member 38 includes gears in only three of the co-planar, intermeshing gear sets (as indicated by planes P1A, P4A and P5A.) The transmission 14 preferably includes only five total co-planar, intermeshing gear sets as indicated by planes P1A through P5A, plus the planetary gear set 70, thereby maximizing compactness.

As indicated in FIG. 1B, a relatively high total ratio coverage ("TRC") of 9.51 is achieved by the transmission 14 between the input member 28 and the output member 32 (i.e., without including any torque ratio boosting affects of the torque converter 16). Additionally, small ratio steps are achieved, especially in the higher torque ratios, to maximize highway cruising fuel economy. A high torque ratio value is achieved in the first forward speed ratio, thus providing adequate ratio coverage for take-off especially in a commercial on-and-off highway line haul vehicle. The ratio steps are small enough to (i) enable lock-up of the torque converter 16 (by engaging lock-up clutch 30) during the first speed ratio, and (ii) lock-up to lock-up shifts, during higher speed ratio, which significantly decreases the cooling demands of transmission 14.

Referring now to FIG. 2A, another embodiment of a powertrain 110 having a transmission 114 within the scope of the present invention is illustrated. FIG. 2A is a "stick-diagram" or schematic representation of transmission 114, in accordance with the present invention. The transmission 114 operates according to the engagement schedule of FIG. 1B (as described above) to achieve the torque ratio and ratio steps between input member 128 and output member 132 as indicated in FIG. 2B.

The engine 12 is connected to the transmission 114 by the engine shaft 20 through the torque converter 16 and the input member 128 (see FIG. 2A.) The torque converter 16 includes a pump portion 18, a stator portion 22 grounded to a stationary member, preferably the transmission housing 124, and a turbine portion 26. The torque converter lock-up clutch 30 may be applied to directly connect the engine shaft 20 with the input member 128, bypassing the ratio boosting effect of the torque converter 16. The torque converter 16 operates as described with respect to FIG. 1A.

The transmission 114 includes a main shaft 134, a first shaft member 136, and a second shaft member 138. It should be understood that the main shaft 134 and the shaft members 136, 138 are preferably in different planes, in a substantially triangular formation. The first and second shaft members 136, 138 are arranged generally parallel with the main shaft 134, synonymous with that of a countershaft transmission. The input member 128 is connected for common rotation with main shaft 134.

The transmission 114 includes a plurality of intermeshing gears as will be described herein. Gear 140 is connected for common rotation with main shaft 134 and continuously intermeshes with gear 142—gear 142 being selectively engageable for common rotation with the first shaft member 136, via clutch C3, or gear 148, via clutch C5. Gears 140 and 142 are also referred to herein as a first head gear set. Gear 140 also continuously intermeshes with gear 146—gear 146 being selectively engageable for common rotation with gear 154, via clutch C1, or gear 152, via clutch C2. Gears 140 and 146 are also referred to herein as a second head gear set. The first and second head gear sets, defined by gears 140, 142, and 146, form a first, co-planar, intermeshing gear set, the co-planar nature of which is indicated by plane P1B in FIG. 2A. By arranging the first and second head gear sets, gears 140, 142, and 146, in a single plane, the compactness of the transmission 114 is maximized.

Referring still to FIG. 2A, additional components of the transmission 114 include gears 148 and 162, also referred to herein as "range gears", which are mounted concentric with and rotatable about the first shaft member 136. Gear 148 is driven by sleeve shaft 165 via direct connection to clutch C5. Gear 148 continuously intermeshes with gear 150, which is supported on and rotatable with sleeve shaft 180 and mounted concentric with main shaft 134. Gears 148 and 150 form a second co-planar, intermeshing gear set, the co-planar nature of which is indicated by plane P2B.

Gear 162 is supported on and rotatable with synchronizer 163. Gear 162 continuously intermeshes with gear 144, which is supported on and rotatable with sleeve shaft 180 and mounted concentric with main shaft 134. Gear 162 is driven by the first shaft member 136 via connection to clutch C5 through synchronizer 163. Gears 162 and 144 form a third co-planar, intermeshing gear set, the co-planar nature of which is indicated by plane P3B.

Gear 152, also referred to herein as a "range gear", is mounted concentric with and rotatable about the second shaft member 138. Gear 152 is driven by sleeve shaft 153 via direct connection to clutch C2. Gear 152 continuously intermeshes with gear 156, which is supported on and rotatable with the sleeve shaft 180 and mounted concentric with the main shaft 134. Gears 152 and 156 form a fourth co-planar, intermeshing gear set, the co-planar nature of which is indicated by plane P4B.

Still referring to FIG. 2A, gear 154, also referred to herein as a "range gear", is supported on and rotatable with the second shaft member 138. Gear 154 is driven by the second shaft member 138 via direct connection with clutch C1. Gear 154 continuously intermeshes with gear 158, which is supported on and rotatable with sleeve shaft 180 and mounted concentric with the main shaft 134. Gear 158, via idler gear 159, also continuously intermeshes with gear 160, which is concentric with and rotatable about the first shaft member 136. Gears 154, 158, 159, and 160 form a fifth co-planar, intermeshing gear set, the co-planar nature of which is indicated by plane P5B.

Synonymous with the first embodiment illustrated in FIG. 1A, it is preferred that the range gears 148, 162 concentric with the first shaft member 136 intermesh with a gear (150, 144, respectively) rotatable about and concentric with the main shaft member 134 and not intermeshing with a range gear 152, 154 concentric with the second shaft member 138. Likewise, it is preferred that each range gear 152, 154, concentric with the second shaft member 138 intermesh with a gear (156, 158, respectively) rotatable about and concentric with the main shaft member 134 and not intermeshing with a range gear 148, 162 concentric with the first shaft member 136.

Also analogous to the embodiment of FIG. 1A, the transmission 114 of FIG. 2A includes the gear 142 being supported by bearing 141, which is disposed radially inside gear 142 and mounted on the flange portion of the adjacent gear 148, both gear 142 and bearing 141 being mounted concentrically with the first shaft member 136. Similarly, gear 148 is supported by bearing 149, which is disposed radially inside gear 148 and mounted on the synchronizer 163, both gear 148 and bearing 149 being mounted concentrically with the first shaft member 136. Furthermore, gear 146 is supported by bearing 151, which is disposed radially inside gear 146 and mounted on the flange portion of the adjacent gear 152, both gear 146 and bearing 151 being mounted concentrically with the second shaft member 138. Likewise, gear 152 is supported by the bearing 155, which is disposed radially inside gear 152 and mounted on the flange portion of the adjacent gear 154, both gear 152 and bearing 155 being mounted concentrically with the second shaft member 136. In this instance, the gears 148, 152 and 154 and synchronizer 163 take the place of the conventional loaded countershafts in that they support the adjacent gears 142, 146, 152 and 148, respectively, and in turn transfer all resultant radial and axial loads to ground, synonymous with the configuration described with respect to FIG. 1A. The bearings 141, 149, 151 and 155 are preferably taper bearings.

Referring again to FIG. 2A, a two-way dog clutch D100 is supported by the synchronizer 163 and mounted concentrically with and shiftable in two directions along the first shaft member 136. Dog clutch D100 is shiftable to the left to connect gear 162 for common rotation with first shaft member 136. The dog clutch D100 is shiftable to the right to connect gear 160 for common rotation with first shaft member 136. When shifted to the left, the dog clutch D100 partially establishes a forward speed ratio, as indicated in the column DF in FIG. 1B. When the dog clutch D is shifted to the right, it partially establishes a reverse speed ratio, according to the torque ratio of FIG. 2B, and the engagement schedule of FIG. 1B, for Rev 2 and Rev 1. Dog clutch D100 operates as described with respect to FIG. 1A.

Referring again to FIG. 2A, the transmission 114 includes planetary gear set 170. Planetary gear set 170 includes a sun gear member 172, a ring gear member 174 and a carrier member 176 that rotatably supports a plurality of pinion gears 177 disposed in meshing relationship with both the sun gear member 172 and the ring gear member 174. The sun gear member 172 is continuously connected for common rotation with the gears 144, 150, 156 and 158 via sleeve shaft 180 and hub member 182. The carrier member 176 is continuously connected for common rotation with the output member 132.

In addition to the dog clutch D100, the transmission 114 includes seven additional torque-transmitting mechanisms, C1-C7, for a total of eight torque-transmitting mechanisms. Clutch C1 is selectively engageable to transmit torque from the main shaft 134 to gear 154—C1 operating as described with respect to FIG. 1A. Clutch C2 is selectively engageable to transmit torque from the main shaft 134 to gear 152—C2 also operating as described with respect to FIG. 1A. Synonymous with the embodiment illustrated in FIG. 1A, clutch C1 is radially nested inside C2, thereby minimizing the length of second shaft member 138.

Clutch C3, of FIG. 2A, is selectively engageable to transmit torque from the main shaft 134 along the first head gear set, gears 140 and 142 in P1B, to the first shaft member 136—C3 operating as described with respect to FIG. 1A. Clutch C5 is selectively engageable to transmit torque from the main shaft 134 to gear 148—C5 also operating as described with respect to FIG. 1A. Synonymous with the embodiment illustrated in FIG. 1A, clutch C3 is radially nested inside C5 thereby minimizing the length of the first shaft member 136.

Referring again to FIG. 2A, clutch C4 is a bypass clutch, selectively engagable to directly connect main shaft 134 with the sun gear member 172, bypassing the shaft members 136 and 138. Clutch C6 is a brake that is selectively engageable to ground the ring gear member 174 to the transmission housing 124. Clutch C7 is selectively engageable to connect the sun gear member 172 and ring gear member 174 for common rotation with gears 144, 150, 156 and 158 via sleeve shaft 180 and hub member 182, locking up planetary gear set 170 such that it, as well as the output member 132, rotates at the same speed as gears 144, 150, 156 and 158.

As noted above, the engagement schedule of the torque-transmitting mechanisms C1-C7 and D100 for the transmission 114 of FIG. 2A is indicated in FIG. 1B to achieve two reverse speed ratios and nine forward speed ratios. As is apparent from FIG. 2A, the gears concentric with the first shaft member 136 are arranged in not more than four co-planar, intermeshing gear sets (as indicated by planes P1B, P2b, P3B and P5B.) The gears concentric with the second shaft member 138 are arranged in only three of the co-planar, intermeshing gear sets (as indicated by planes P1B, P4B and P5B.) The transmission 114 preferably includes not more than five total co-planar, intermeshing gear sets as indicated by planes P1B through P5B, plus the planetary gear set 170, thus maximizing compactness.

Referring to FIG. 3A, another embodiment of a powertrain 210 with a transmission 214 within the scope of the present invention is illustrated. The powertrain 210 includes an engine 12 with an engine shaft 20 connected through a torque converter 16 to an input member 228 of the transmission 214. The torque converter lock-up clutch 30 may be applied to directly connect the engine output shaft 20 with the input member 228, bypassing the ratio boosting effect of the torque converter 16. The torque converter 16 includes a pump portion 18, a stator portion 22 preferably grounded to transmission housing 224, and a turbine portion 26. The torque converter 16 operates as described with respect to FIG. 1A.

The transmission 214 is operable to provide two reverse speed ratios and either eight forward speed ratios (as indicated by the torque ratios and engagement schedule of FIG. 3B) or seven forward speed ratios (as indicated by the torque ratios and engagement schedule of FIG. 3C) between input member 228 and output member 232.

Referring again to FIG. 3A, the input member 228 is connected for common rotation with main shaft 234. The transmission 214 further includes first shaft member 236 and a second shaft member 238, both spaced from the main shaft 234 and arranged substantially parallel therewith (coterminous with the embodiment of FIG. 1A.)

The main shaft 234 has gear 241 connected for common rotation therewith. Gear 240 continuously intermeshes with gear 242, gear 242 being selectively engageable for common rotation with gear 260, via clutch C3, or gear 248, via clutch C5. Gears 240 and 242 may be referred to as a first head gear set. Gear 240 also continuously intermeshes with gear 246, which is selectively engageable for common rotation with gear 254, via clutch C1, or gear 252, via clutch C2. Intermeshing gears 240 and 246 may be referred to as a second head gear set. Gears 240, 242, and 246 form a first co-planar, intermeshing gear set, as indicated by plane P1C.

Gear 248 is concentric with and rotatable about first shaft member 236. Gear 248 is driven by sleeve shaft 265 via direct connection to clutch C3. Gear 248 continuously intermeshes with gear 250, which is supported on and rotatable with sleeve shaft 280 and mounted concentric about the main shaft 234. Gears 248 and 250 form a second co-planar, intermeshing gear set, the co-planar nature of which is indicated by plane P2C.

Referring still to FIG. 3A, the transmission 214 further includes gear 252 and gear 254, both of which mounted concentrically with the second shaft member 238. Gear 252 is driven by the sleeve shaft 253 via a direct connection to clutch C2 and is rotatable about the second shaft member 238. Gear 252 continuously intermeshes with gear 256, which is rotatably supported on sleeve shaft 280 and mounted concentric with the main shaft 234. Gears 252 and 256 form a third co-planar, intermeshing gear set, the co-planar nature of which is indicated by plane P3C.

Gear 254 is driven by the second shaft member 238 via a direct connection to clutch C1. Gear 254 continuously intermeshes with gear 258, which is rotatably supported on sleeve shaft 280 and mounted concentric with main shaft 234. Gear 258, via idler gear 259, also continuously intermeshes with gear 260, which is concentric with and supported for common rotation on first shaft member 236. Gears 254, 258, 259 and 260 form a fourth co-planar, intermeshing gear set, the co-planar nature of which is indicated by plane P4C. Gears 248, 252, and 254 may also be referred to herein as "range gears".

As shown in FIG. 3A, it is preferred that the range gear 248, concentric with the first shaft member 236, intermesh with a gear 250 rotatable about and concentric with the main shaft member 234 that is not intermeshing with either range gear 252, 254 concentric with the second shaft member 238 (similar to the embodiment illustrated in FIG. 1A.) Correspondingly, it is preferred that the range gears 252, 254 concentric with the second shaft member 238 intermesh with a gear (256, 258, respectively) rotatable about and concentric with the main shaft member 234 and not intermeshing with a range gear 248 concentric with the first shaft member 236.

Also comparable to the embodiments of FIGS. 1A and 2A, the transmission 214 of FIG. 3A includes the gear 242 being supported by bearing 241, bearing 241 being disposed radially inside gear 242 and mounted on the flange portion of the adjacent gear 248, both gear 242 and bearing 241 being mounted concentrically with the first shaft member 236. Similarly, gear 248 is supported by bearing 249, which is disposed radially inside gear 248 and mounted on the flange portion of the adjacent gear 260, both gear 248 and bearing 249 being mounted concentrically with the first shaft member 236. Furthermore, gear 246 is supported by bearing 251, which is disposed radially inside gear 246 and mounted on the flange portion of the adjacent gear 252, both gear 246 and bearing 251 being mounted concentrically with the second shaft member 238. Likewise, gear 252 is supported by the bearing 255, which is disposed radially inside gear 252 and mounted on the flange portion of the adjacent gear 254, both gear 252 and bearing 255 being mounted concentrically with the second shaft member 236. In this instance, gears 248, 252, 254 and 260 take the place of the conventional loaded countershaft in that they support the adjacent gears 242, 246, 252 and 248, respectively, and in turn transfer the resultant radial and axial loads to ground, synonymous with the configuration described with respect to FIGS. 1A and 2A. The bearings 241, 249, 251 and 255 are preferably taper bearings.

Referring again to FIG. 3A, the transmission 214 further includes a planetary gear set 270. The planetary gear set 270 includes a sun gear member 272, a ring gear member 274 and a carrier member 276 which rotatably supports a plurality of pinion gears 277. The pinion gears 277 intermesh with both the sun gear member 272 and the ring gear member 274. The carrier member 276 is continuously connected with the output member 232. The sun gear member 272 is connected for common rotation with gears 250, 256, and gear 258 via sleeve shaft 280 and hub member 282.

The transmission 214 includes seven torque-transmitting mechanisms, C1, C2, C3, C4, C5, C6 and C7. C1-C7 are engageable to establish two reverse speed ratios and either eight forward speed ratios (according to the engagement schedule set forth in the truth table of FIG. 3B) or seven forward speed ratios (according to the engagement schedule set forth in the truth table of FIG. 3C) between the input member 228 and the output member 232.

C1 is a rotating clutch selectively engage able to connect gear 254 for common rotation with gear 246—C1 operating as described with respect to FIG. 1A. C2 is a rotating clutch selectively engageable to connect gear 252 for common rotation with gear 246—C2 also operating as described with respect to FIG. 1A. Synonymous with the embodiment illustrated in FIG. 1A, clutch C1 is radially nested inside C2.

C3, of FIG. 3A, is a rotating clutch selectively engageable to connect gear 260 for common rotation with gear 242. In this embodiment, C3 must be in an "on state", allowing torque to be transmitted from the main shaft 234 to gear 260, via gear 242 and first shaft member 236, in order for the transmission 214 to provide reverse speed ratios (as depicted in the columns labeled "Rev 1" and "Rev 2" of FIGS. 3B and 3c.) C5 is selectively engageable to connect gear 248 for common rotation with gear 242—C5 operating as described with respect to FIG. 1A. Synonymous with the embodiment illustrated in FIG. 1A, clutch C3 is radially nested inside C5.

C4 is a bypass clutch selectively engageable to directly connect the main shaft 234 for common rotation with the sun gear member 272, thus bypassing shaft members 236 and 238. Torque-transmitting mechanism C6 is a brake, selectively engageable to ground the ring gear member 274 to the transmission housing 224. Rotating clutch C7 is referred to herein as a lock-up clutch and is selectively engageable to lock-up the planetary gear set 270. By connecting sleeve shaft 280, and thereby gears 250, 256 and 258, to both the ring gear member 274 and the sun gear member 272, clutch C7 causes both the sun gear member 272 and the ring gear member 274, and therefore the entire planetary gear set 270 as well as the output member 232, to rotate at the same speed.

As is apparent from FIG. 3A, both the first and second shaft members 236, 238 preferably include gears arranged in not more than three co-planar, intermeshing gear sets. By way of example, first shaft member 236 includes gears 242, 248, and 260 arranged in only three of the co-planar, intermeshing gear sets (as indicated by planes P1C, P2C, and P4C, respectively.) The second shaft member 238 includes gears 246, 252 and 254 arranged in only three of the co-planar, intermeshing gear sets (as indicated by planes P1C, P3C, and P4C, respectively.) The transmission 214 preferably includes only four total co-planar, intermeshing gear sets as indicated by planes P1C through P4C, plus the planetary gear set 270, thus maximizing compactness. Additionally, because the first and second head gear sets, that is gears 240 and 242, and gears 240 and 246, respectively, are used to provide a ratio change, and the planetary gear set 270 may be utilized for further ratio coverage, the number of components required on the first and second shaft members 236, 238 to provide ratio is minimized, enabling further minimization of the overall length of the shaft members 236 and 238, and thus the transmission 214.

As will be apparent to those skilled in the art, many gear tooth counts resulting in various torque ratio, ratio step and total ratio coverage values may be used within the scope of the present invention—the embodiments illustrated in FIGS. 1A, 2A, and 3A. Each of the transmission embodiments described herein is characterized by an absence of dual input clutches and of dual output clutches. As those skilled in the art will readily understand, "dual input clutches" are alternatively selectively engagable clutches which transfer torque alternatively to the two countershafts in a conventional countershaft transmission. Similarly, "dual output clutches" are alternatively selectively engageable clutches supported on the two countershafts of a conventional countershaft transmission which are alternately engageable to transfer torque from the respective countershafts to the output member.

A method of reducing the length and weight of a transmission package, described below with respect to the structure illustrated in FIG. 1A, may be employed in any of the respective embodiments described above in FIGS. 1A through 3C. Furthermore, the method may also be applied to other transmissions. The transmission package 14 includes a main shaft member 34 and a pair of secondary shaft members 36, 38 arranged in a substantially parallel, triangular formation with the main shaft member 34 (i.e., when viewed from an end of the transmission, the axes of the shafts form a triangle.) The transmission package 14 also includes a plurality of gears that are selectively interconnectable with respective clutches C1, C2, C3, C5 to obtain a plurality of selectable gear ratios. The method includes nesting (or radially stacking) at least some of the clutches C1, C2, C3, C5 sufficiently to at least partially reduce the length of the package 14. The method further includes supporting at least one of the gears (preferably gears 42, 46, 48, and 52) concentric with the secondary shaft members 36, 38 on a bearing (41, 51, 49, and 55, respectively) which is disposed on an adjacent gear or synchronizer (48, 52, 63, and 54, respectively) rather than on one of the secondary shaft members 36, 38, allowing for that secondary shaft member 36 and/or 38 to be sufficiently shorter and lighter to fit within and further reduce the length and weight of the transmission package 14. Additionally, the method includes providing that each forward range gear (48 and 62, or 52 and 54) concentric with one of the secondary shaft members (36 or 38, respectively) directly interconnects with a gear on the main shaft member (50 and 44, or 56 and 58, respectively) that does not directly interconnect with another forward range gear (52 and 54, or 48 and 62, respectively) concentric with the other secondary shaft member (38 or 36, respectively) thereby permitting improved flexibility in the selection of gears (and thus gear ratios) for the transmission package 14.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a main shaft operatively connected with said input member;
   a first and a second shaft member, each spaced from and substantially parallel with said main shaft;
   a plurality of gears for transferring torque between said main shaft and said first and second shaft members and forming different co-planar, intermeshing gear sets, wherein each of said first and second shaft members has different ones of said plurality of gears concentric therewith and partially forming not more than four of said co-planar, intermeshing gear sets, wherein said co-planar, intermeshing gear sets include:
a first head gear set for transferring torque from said main shaft to said first shaft member; and
a second head gear set for transferring torque from said main shaft to said second shaft member, wherein said first and second head gear sets form a first of said co-planar, intermeshing gear sets; wherein one of said gears is connected for common rotation with both of said input member and said main shaft and is included in both of said head gear sets;
a planetary gear set operatively connected between said input member and said output member; wherein all of said co-planar, intermeshing gear sets are spaced axially between said input member and said planetary gear set; and
at least seven torque-transmitting mechanisms selectively engagable to establish at least seven forward speed ratios and at least one reverse speed ratio between said input member and said output member, wherein at least one of said torque-transmitting mechanisms is radially nested in at least a second of said torque-transmitting mechanisms.

2. The transmission of claim 1, wherein said at least seven torque-transmitting mechanisms includes four torque-transmitting mechanisms each of which is a rotating clutch concentric with one of said shaft members, wherein two of said four torque transmitting mechanisms is each radially nested within one of the other two of said four torque transmitting mechanisms.

3. The transmission of claim 2, wherein said plurality of gears includes two gears concentric with said first shaft member for transferring torque between said first shaft member and said main shaft and two gears concentric with said second shaft member for transferring torque between said second shaft member and said main shaft;
wherein at least one of said gears concentric with said first shaft member continuously intermeshes with a gear concentric with said main shaft that is not continuously intermeshing with either of said two gears concentric with said second shaft member, said at least one gear at least partially forming a second of said co-planar, intermeshing gear sets; wherein said first and second head gear sets are spaced axially between said input member and said second co-planar, intermeshing gear set; and
wherein at least one of said gears concentric with said second shaft member continuously intermeshes with a gear concentric with said main shaft that is not continuously intermeshing with either of said two gears concentric with said first shaft member, said at least one gear concentric with said second shaft member at least partially forming a third of said co-planar, intermeshing gear sets.

4. The transmission of claim 3, wherein said two gears concentric with said first shaft member each continuously intermeshes with a gear concentric with said main shaft that is not continuously intermeshing with either of said two gears concentric with said second shaft member.

5. The transmission of claim 3, wherein at least one of said gears concentric with said first shaft member is operatively supported by a second gear and not supported by said first shaft member.

6. The transmission of claim 5, wherein at least one of said gears concentric with said second shaft member is operatively supported by a second gear and not supported by said second shaft member.

7. The transmission of claim 6, wherein at least one of said torque-transmitting mechanism is a two-way dog clutch concentric with said first shaft member, shiftable in one direction to partially establish said reverse speed ratio and shiftable in an opposite direction to at least partially establish said forward speed ratios.

8. The transmission of claim 7, wherein at least one of said torque-transmitting mechanism is a bypass torque-transmitting mechanism selectively engagable to transfer torque directly from said input member to said planetary gear set, thereby bypassing said shaft members.

9. The transmission of claim 8, wherein said planetary gear set includes a ring gear member, a carrier member and a sun gear member; and wherein said torque-transmitting mechanisms include a brake selectively engagable to ground said ring gear member to a stationary member.

10. The transmission of claim 8, wherein said planetary gear set includes a ring gear member, a carrier member and a sun gear member; and wherein said torque-transmitting mechanisms include a lock-up torque-transmitting mechanism selectively engagable to connect any two of said members of said planetary gear set for common rotation.

11. A transmission comprising:
an input member;
an output member;
a main shaft operatively connected to said input member;
a first and a second shaft member, each spaced from and substantially parallel with said main shaft;
a plurality of gears arranged in not more than five co-planar, intermeshing gear sets, each of said gears concentric about one of said main shaft, said first shaft member and said second shaft member;
a planetary gear set operatively connected to at least two of said gears and directly connected to said output member, wherein said planetary gear set includes a ring gear member, a carrier member and a sun gear member;
at least seven torque-transmitting mechanisms selectively engagable to establish at least seven forward speed ratios and at least one reverse speed ratio between said input member and said output member, wherein said torque-transmitting mechanisms include four torque-transmitting mechanisms each of which is a rotating clutch concentric with one of said shaft members and at least two of said four torque transmitting mechanisms being radially nested within the other two of said four torque transmitting mechanisms; and
wherein said plurality of gears includes at least two range gears concentric with said first shaft member and at least two range gears concentric with said second shaft member, said at least two range gears concentric with said second shaft member each being engageable with said main shaft by a gear not engageable by said range gears concentric with said first shaft member.

12. The transmission of claim 11, wherein said at least two range gears concentric with said first shaft member each being engageable with said main shaft by a gear not engageable by said range gears concentric with said second shaft member.

13. The transmission of claim 11, wherein said plurality of gears includes at least two gears concentric with said first shaft member and one of said at least two gears is operatively supported on the other of said at least two gears and not supported by said first shaft member.

14. The transmission of claim 13, wherein said plurality of gears further includes at least two gears concentric with said second shaft member and one of said at least two gears is operatively supported on the other of said at least two gears and not supported by said second shaft member.

15. The transmission of claim 14, wherein one of said torque-transmitting mechanisms is a dog clutch shiftable to connect one of said gears for common rotation with said first shaft member to partly establish said reverse speed ratio.

16. The transmission of claim 14, wherein said torque-transmitting mechanisms include a bypass torque-transmitting mechanism selectively engagable to transfer torque directly from said input member to said planetary gear set, thereby bypassing said shaft members, and a brake selectively engagable to ground said ring gear member to a stationary member.

17. A transmission comprising:
an input member;
an output member;
a main shaft operatively connected to said input member;
a first and a second shaft member, each spaced from and substantially parallel with said main shaft;
a plurality of gears forming different co-planar, intermeshing gear sets, each of said gears concentric about one of said main shaft, said first shaft member an said second shaft member, wherein said gears concentric with said first and second shaft members partially form not more than five of said co-planar, intermeshing gear sets; wherein said plurality of gears includes at least two gears concentric with said first shaft member, one of said at least two gears being operatively supported on the other of said at least two gears and not supported by said first shaft member;
wherein said not more than five of said co-planar, intermeshing gear sets include a first head gear set for transferring torque from said main shaft to said first shaft member and a second head gear set for transferring torque from said main shaft to said second shaft member; wherein one of said gears is connected for common rotation with both of said input member and said main shaft and is included in both of said head gear sets, said first and second head gear sets thereby forming a first of said not more than five co-planar, intermeshing gear sets;
a planetary gear set operatively connected to at least two of said gears and directly connected to said output member; and
at least seven torque-transmitting mechanisms selectively engagable to establish at least seven forward speed ratios and at least one reverse speed ratio between said input member and said output member.

18. The transmission of claim 17, wherein said plurality of gears further includes at least two gears concentric with said second shaft member, one of said gears being operatively supported on the other of said at least two gears and not supported by said second shaft member.

19. The transmission of claim 18, wherein said at least two gears concentric with said second shaft member each being engageable with said main shaft by a gear not engageable by gears concentric with said first shaft member.

20. The transmission of claim 19, wherein said at least two gears concentric with said first shaft member each being engageable with said main shaft by a gear not engageable by gears concentric with said second shaft member.

21. The transmission of claim 19, wherein one of said torque-transmitting mechanisms is a dog clutch concentric with said first shaft member and shiftable in one direction to at least partially establish a reverse speed ratio and in another direction to at least partially establish at least seven forward speed ratios; and wherein said shaft members are characterized by an absence of any additional torque-transmitting mechanisms.

22. A method of reducing the length and weight of a transmission package including a main shaft member and a pair of secondary shaft members arranged in a substantially parallel, triangular formation with said main shaft member, and a plurality of gears selectively interconnectable with respective clutches to obtain a plurality of selectable ratios, said method comprising:
nesting at least some of said clutches sufficiently to at least partially reduce the length of said package;
supporting at least one of said gears on a bearing disposed on an adjacent gear rather than on one of said secondary shaft members so that said one of said secondary shaft members is sufficiently shorter and lighter to fit within and further reduce the length of said package;
providing a first head gear set for transferring torque from said main shaft member to a first of said secondary shaft members, and a second head gear set for transferring torque from said main shaft member to a second of said secondary shaft members, wherein said first and second head gear sets are coplanar and both include one of said gears that is continuously connected for common rotation with both of said input member and said main shaft member;
and
providing that each forward range gear concentric with one of said secondary shaft members directly interconnects with a gear on said main shaft member that does not directly interconnect with another forward range gear concentric with said other secondary shaft member permitting improved flexibility in the selection of said ratios.

* * * * *